United States Patent
Tanimoto

(10) Patent No.: US 7,236,835 B2
(45) Date of Patent: Jun. 26, 2007

(54) REMOTE MAINTENANCE SYSTEM, COMMUNICATION TERMINAL DEVICE AND CENTER DEVICE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 11/404,755

(22) Filed: Apr. 17, 2006

(65) Prior Publication Data

US 2007/0005157 A1  Jan. 4, 2007

(30) Foreign Application Priority Data

May 24, 2005 (JP) ............................. 2005-151303
May 24, 2005 (JP) ............................. 2005-151307

(51) Int. Cl.
| G05B 11/01 | (2006.01) |
| G05B 15/02 | (2006.01) |
| G05B 19/18 | (2006.01) |
| G06F 11/00 | (2006.01) |
| G06F 3/00 | (2006.01) |
| H04N 1/00 | (2006.01) |

(52) U.S. Cl. ............................. 700/21; 700/9; 714/46; 714/48; 358/406; 710/15

(58) Field of Classification Search ................ 709/227; 358/1.14, 1.15, 406; 714/46, 48; 700/9, 700/21; 710/15

See application file for complete search history.

(56) References Cited

U.S. PATENT DOCUMENTS

| 5,196,944 | A | * | 3/1993 | Satake ........................ 358/404 |
| 5,477,338 | A | * | 12/1995 | Fujii et al. ................... 358/400 |
| 5,825,990 | A | * | 10/1998 | Heo et al. ................... 358/1.14 |
| 5,936,746 | A | * | 8/1999 | Hirokawa ................... 358/468 |
| 6,459,504 | B1 | * | 10/2002 | Murano et al. .............. 358/406 |
| 6,665,085 | B1 | * | 12/2003 | Edmunds et al. ........... 358/1.15 |
| 6,775,238 | B1 | * | 8/2004 | Suzuki ....................... 370/242 |
| 6,927,868 | B1 | * | 8/2005 | Otsuka et al. ............. 358/1.15 |
| 6,947,675 | B2 | * | 9/2005 | Koyama et al. ............... 399/8 |
| 7,124,326 | B1 | * | 10/2006 | Niikawa ...................... 714/37 |
| 7,149,936 | B2 | * | 12/2006 | Deshpande et al. ........... 714/57 |
| 2001/0003827 | A1 | * | 6/2001 | Shinamura .................. 709/206 |

FOREIGN PATENT DOCUMENTS

| JP | 11-305978 | 11/1999 |
| JP | 2004-201181 | 7/2004 |

* cited by examiner

*Primary Examiner*—Ronald D. Hartman, Jr.
(74) *Attorney, Agent, or Firm*—Westerman, Hattori, Daniels & Adrian, LLP.

(57) ABSTRACT

A failure code indicating a failure content in a communication terminal device is automatically notified to a center device. The center device automatically makes a call to a user of the communication terminal device with the failure. When a trouble generates in the communication terminal device, the user of the communication terminal device can communicate with an operator of the center device in accordance with an operation of the user.

2 Claims, 14 Drawing Sheets

DIGITAL MFP 20

DIGITAL MFP 2020

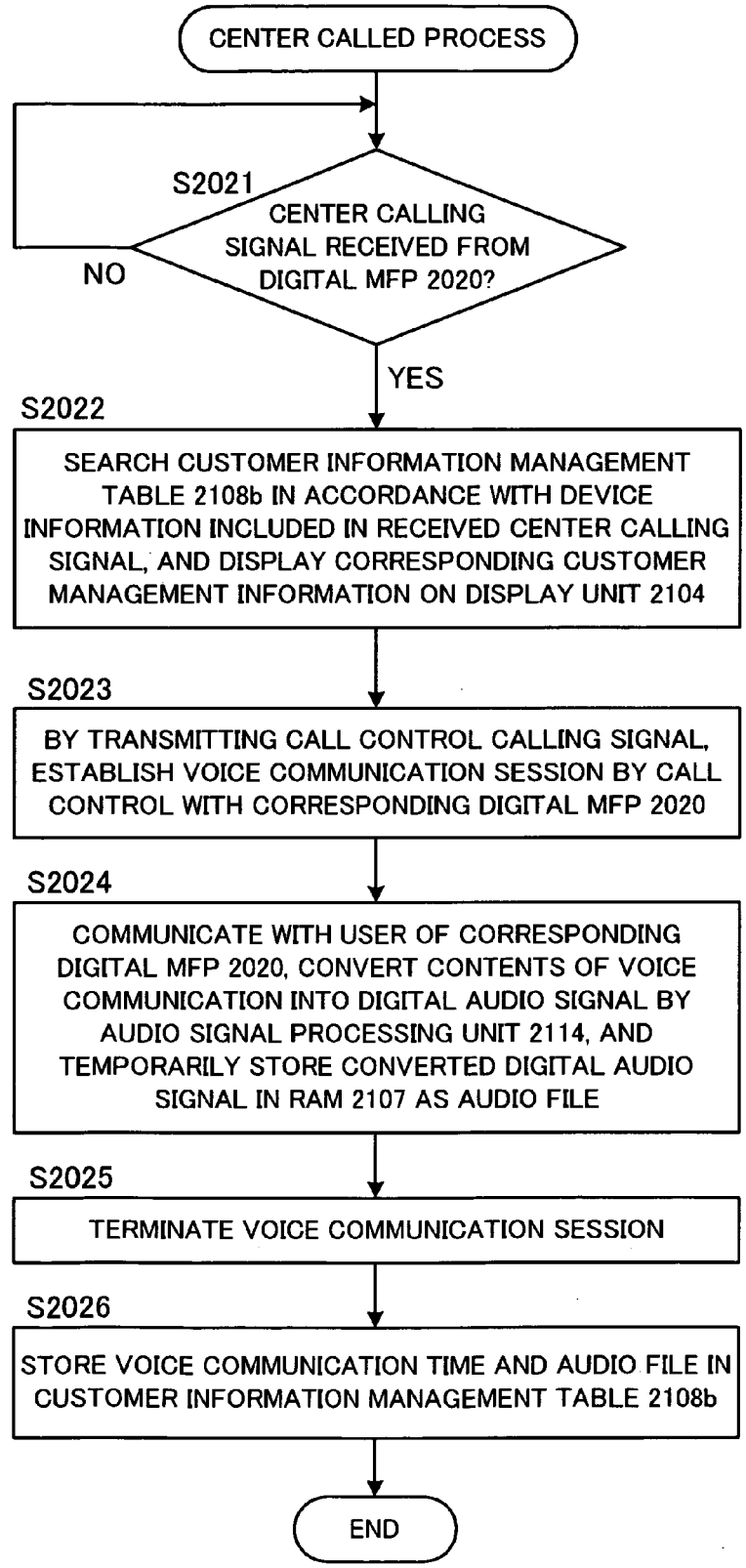

REMOTE MAINTENANCE SYSTEM, COMMUNICATION TERMINAL DEVICE AND CENTER DEVICE

BACKGROUND OF THE INVENTION

1. Field of the Invention

The present invention relates to a remote maintenance system including a communication terminal device, such as a digital Multi Function Peripheral (MFP) and a facsimile machine, and a center device remotely managing a failure or the like in the communication terminal device, and also relates to the communication terminal device and the center device.

2. Description of the Related Art

A conventional remote maintenance system remotely monitors an operation status of various electronic equipments and devices installed in home, offices, factory, etc. and carries out a maintenance on a target device when an abnormality generates. In such a remote maintenance system, specifically, a remote diagnosis is performed via a telephone line, and a remote service center controls a reading process of data stored in a terminal device and a writing process of data in the terminal device.

In the conventional remote maintenance system, when a user originates a call through a Public Switched Telephone Network (PSTN), the user is charged for communication costs. In addition, only low-speed data communication can be performed over the PSTN, and the PSTN is not suitable for data communication of a large quantity.

SUMMARY OF THE INVENTION

In order to overcome the problems described above, an advantage of the present invention is to provide a remote maintenance system, in which a communication terminal device, such as a facsimile machine and a digital MFP, is connected to a center device via the Internet or the like, a failure code indicating a failure content is automatically notified to the center device and a call can be made automatically from the center device to a user of the communication terminal device with a failure, and also to provide the communication terminal device and the facsimile machine.

Another advantage of the present invention is to provide a center device in a remote maintenance system, wherein when a trouble generates in a communication terminal device, an operator of the center device can easily communicate with a user of the communication terminal device in accordance with a prescribed operation of the user of the communication terminal device.

According to a preferred aspect of the present invention, a remote maintenance system includes a communication terminal device and a center device. The center device is connected to the communication terminal device via a prescribed communication line, and manages a failure in the communication terminal device. The center device includes a storage unit which stores device information of the communication terminal device and a customer information management table. In response to a failure notification signal including the device information from the communication terminal device, the center device refers to the customer information management table, and automatically transmits a call instruction signal to the communication terminal device via the communication line. The communication terminal device responds to the call instruction signal, and notifies the call to the user.

According to another preferred aspect of the present invention, a center device is connected to a communication terminal device via a prescribed communication line in a remote maintenance system, and manages a failure in the communication terminal device. The remote maintenance system includes the communication terminal device and the center device. The center device includes a storage unit which stores device information of the communication terminal device and a customer information management table. In response to a failure notification signal including the device information from the communication terminal device, the center device refers to the customer information management table, and automatically transmits a call instruction signal to the communication terminal device via the communication line.

According to another preferred aspect of the present invention, a communication terminal is connected to a center device via a prescribed communication line in a remote maintenance system. Further, the center device manages a failure in the communication terminal device. The communication terminal device responds to a call instruction signal from the center device, and notifies the call to a user. Then, in accordance with an instruction of the user, the communication terminal device automatically transmits a center calling signal via the communication line.

According to another preferred aspect of the present invention, a center device is connected to a communication terminal device via an Internet Protocol (IP) network and manages the communication terminal device. The center device includes a storage unit and a control unit. The storage unit stores a table including customer management information for each communication terminal device or information of the communication terminal device for each customer management information. The control unit receives a center calling signal including device information transmitted from the communication terminal device via the IP network in accordance with a prescribed operation of the communication terminal device. The control unit searches and notifies the customer management information in accordance with the device information included in the received center calling signal. In addition, the control unit establishes a voice communication session between the communication terminal device and the center device via the IP network.

According to the remote maintenance system of the present invention, the center device responds to the failure notification signal including the device information of the communication terminal device transmitted from the communication terminal device, and refers to the customer information management table. The center device automatically transmits a call instruction signal to the communication terminal device via the communication line. The communication terminal device responds to the call instruction signal and notifies the call to the user. Therefore, the center device can automatically make a call to the user of the communication terminal device with the failure.

After the communication terminal device notifies the call to the user, the communication terminal device automatically transmits a center calling signal via the communication line to the center device in accordance with an instruction of the user. Therefore, the communication terminal device can automatically call the operator of the center device in accordance with the instruction of the user of the communication terminal device with respect to the call made to the user from the center device.

The center device responds to the center calling signal including the device information from the communication terminal device, and refers to the customer information management table. The center device automatically makes a call to the communication terminal device via the communication line to enable communication between the center device and the communication terminal device. Therefore, the operator of the center device and the user of the communication terminal device can communicate via the communication line, such as the Internet, regarding the failure.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 14 is a flowchart illustrating a center called process executed by the main control unit of the center device of FIG. 10 according to a third preferred embodiment of the present invention.

DETAILED DESCRIPTION OF PREFERRED EMBODIMENTS (First Preferred Embodiment) A description will be made of a first preferred embodiment of the present invention with reference to the drawings. In the following first preferred embodiment, like reference numeral is assigned to like constituent element.

FIG. 1 is a block diagram illustrating a configuration of a LAN system, including a digital MFP 20 as a facsimile machine with a copying function, a printer function and a scanner function, and a remote maintenance system in which the digital MFP 20 is connected to a center device 40 via the Internet 90, according to the first preferred embodiment of the present invention.

Figure 1:
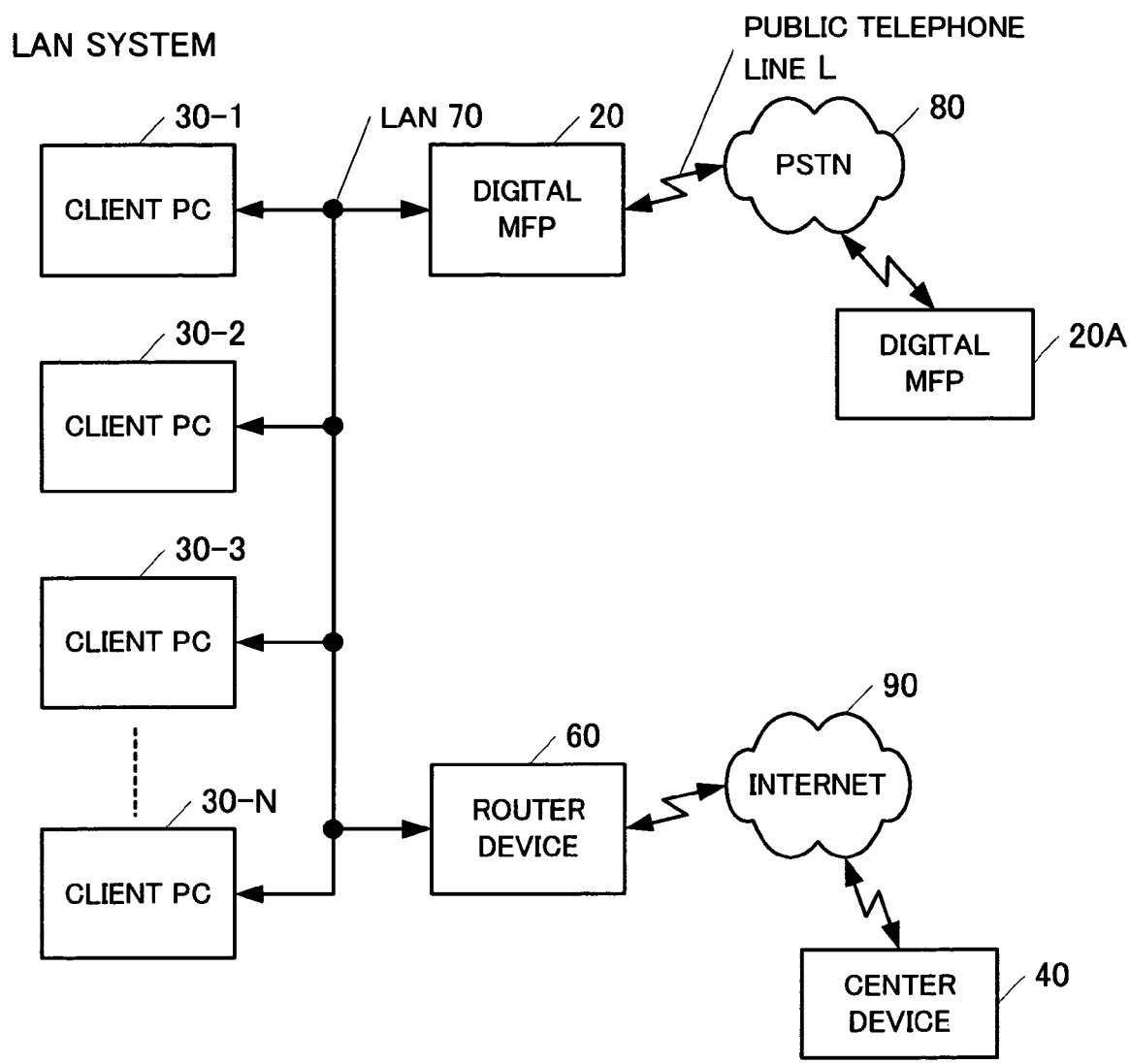
FIG. 1 is a block diagram illustrating a configuration of a Local Area Network (LAN) system, including a digital MFP as a facsimile machine with a copying function, a printer function and a scanner function, and a remote maintenance system in which the digital MFP is connected to a center device via the Internet, according to a first preferred embodiment of the present invention.

In the LAN system according to the first preferred embodiment, N client Personal Computers (PCs) 30-1 through 30-N (hereinafter collectively referred to as a "client PC 30"), the digital MFP 20 and a router device 60 are connected via a LAN 70. The digital MFP 20 is connected to a PSTN 80 via a public telephone line L. The router device 60 is connected to the Internet 90. Each client PC 30 is connected to the Internet 90 via the router device 60 or a mail server device (not illustrated). Accordingly, each client PC 30 can browse a webpage and transmit and/or receive electronic mail. By accessing the digital MFP 20, each client PC 30 can use each of the copying function, the printer function, the scanner function and a facsimile function of the digital MFP 20.

The digital MFP 20 is a communication terminal device according to the first preferred embodiment of the present invention. For example, the digital MFP 20 carries out facsimile communication with another digital MFP 20A via the PSTN 80. In addition, the digital MFP 20 is connected to the center device 40 via the router device 60 and the Internet 90. Further, the center device 40 remotely controls the digital MFP 20.

The remote maintenance system according to the first preferred embodiment includes the digital MFP 20 and the center device 40. The center device 40 is connected to the digital MFP 20 via the Internet 90, and manages a failure in the digital MFP 20. The center device 40 (FIG. 3) includes a hard disk drive 108 storing a customer information management table 108b. The customer information management table 108b stores device information of the digital MFP 20 (for example, a device serial number) and address information corresponding to the device information (for example, a global IP address or an IP telephone number for Session Initiation Protocol (SIP) communication). The center device 40 responds to a failure notification signal including the device information from the digital MFP 20, refers to the customer information management table 108b, and searches the address information corresponding to the device information. Then, the center device 40 automatically transmits a call instruction signal via the Internet 90 to the digital MFP 20 having the searched address information. In response to the call instruction signal, the digital MFP 20 lights a calling key 5a of an operation unit 5 of FIG. 4 and/or sounds a buzzer to notify the call to a user. Further, when the center device 40 responds, the center device 40 is not necessarily required to search the address information. For example, the center device 40 may originate a call to the address information notified from the digital MFP 20 or originate a call to a telephone number of a general public communication network.

After the digital MFP 20 notifies the call to the user, the user carries out an instruction, for example, by pressing the calling key 5a of the operation unit 5. In accordance with the instruction of the user, the digital MFP 20 automatically transmits a center calling signal via the Internet 90 to the center device 40. In response to the center calling signal including the device information from the digital MFP 20, the center device 40 refers to the customer information management table 108*b* and searches address information corresponding to the device information. The center device 40 automatically makes a call via the Internet 90 to the digital MFP 20 having the searched address information. Accordingly, voice communication becomes capable of being carried out between the center device 40 and the digital MFP 20 by the SIP, and the user of the digital MFP 20 can communicate with an operator of the center device 40 regarding the failure. Further, when making a call from the center device 40 to enable voice communication, the center device 40 is not necessarily required to search the address information. For example, the center device 40 may originate a call to the address information notified from the digital MFP 20 or originate a call to a telephone number of a general public communication network.

The client PC 30 of FIG. 1 is a remote terminal device, for example, a known PC. The client PC 30 executes a process of generating, recording and storing of image data and/or character data. In the present preferred embodiment, as one example, the client PC 30 is a remote terminal device which receives image data scanned by a scanner. Alternatively, the client PC 30 is an information processing device which carries out facsimile transmission of image data of an original document image generated by the client PC 30 (for example, image data of an original document created by software of a word processor) to a destination communication terminal device, such as a facsimile machine or a digital MFP, via the digital MFP 20.

Figure 2:
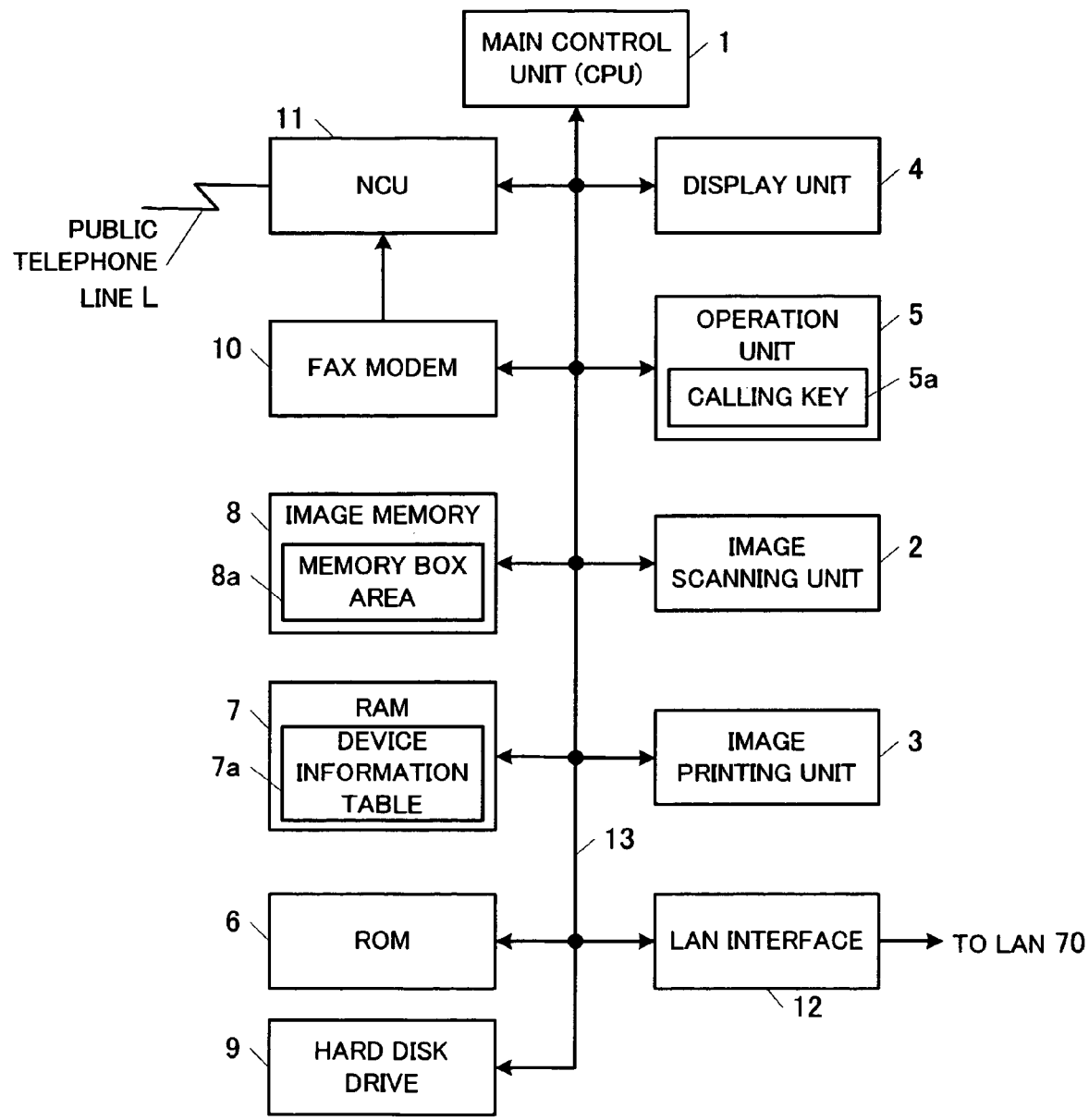
FIG. 2 is a block diagram illustrating a configuration of the digital MFP of FIG. 1.

FIG. 2 is a block diagram illustrating a configuration of the digital MFP 20 of FIG. 1.

In FIG. 2, the digital MFP 20 includes a copying function, a printer function and a scanner function in addition to a conventional Group 3 (G3) facsimile communication function. A main control unit 1 is specifically a Central Processing Unit (CPU). The main control unit 1 is connected to each of following hardware components via a bus 13 and controls each of the hardware components. In addition, the main control unit 1 executes various software functions described hereinafter. An image scanning unit 2 scans an original document by a scanner using a Charge-Coupled Device (CCD) or the like, and outputs dotted image data converted in a binary of black and white. An image printing unit 3 is an electrophotographic printer device, for example. The image printing unit 3 prints out as a hardcopy, image data scanned and converted by the image scanning unit 2 and image data received from another facsimile machine in facsimile communication. The image printing unit 3 also prints out character data.

Figure 4:
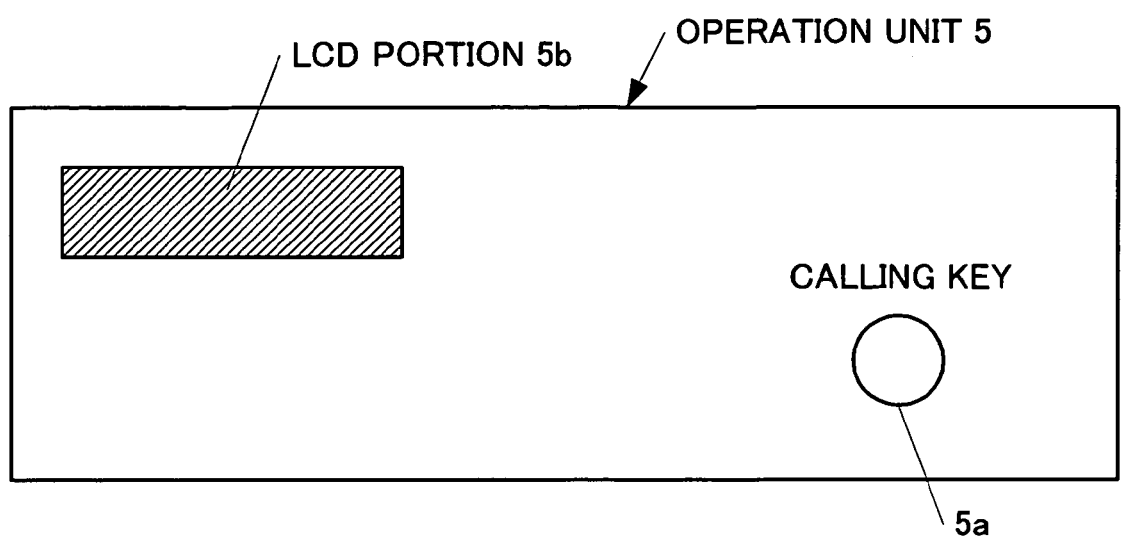
FIG. 4 is a front view illustrating an example of an operation unit of FIG. 2.

A display unit 4 is a display device such as a Liquid Crystal Display (LCD) or a Cathode Ray Tube (CRT) display. The display unit 4 displays an operation status of the digital MFP 20. The display unit 4 also displays image data of a transmission original document and received image data. The operation unit 5 includes character keys, a ten-key numeric pad for dialing, speed dial keys, one-touch dial keys and various function keys necessary for operating the digital MFP 20. As illustrated in FIG. 4, the operation unit 5 includes an LCD portion 5*b* as the display unit 4 and the calling key 5*a*. Further, the LCD portion 5*b* is arranged in a left portion of the operation unit 5, and the calling key 5*a* is arranged in a right portion of the operation unit 5. The calling key 5*a* includes an ON/OFF switch and an LED for calling the user. The LED of the calling key 5*a* is lighted in response to a calling lighting instruction signal from the center device 40. Further, by forming the display unit 4 as a touch screen, a part or all of the various keys of the operation unit 5 may be substituted.

A Read Only Memory (ROM) 6 previously stores various software programs necessary for an operation of the digital MFP 20 and executed by the main control unit 1. In the present preferred embodiment, the ROM 6 stores at least a program of a failure detecting process illustrated in FIG. 5. A Random Access Memory (RAM) 7 includes a Static RAM (SRAM), a Dynamic RAM (DRAM), a Synchronous DRAM (SDRAM) or the like. The RAM 7 is used as a working area of the main control unit 1 and stores temporary data that generates at an execution of a program. The RAM 7 stores a device information table 7*a* storing device information, such as a device model number and a serial number, of the digital MFP 20. Further, when a flash memory is used as the RAM 7, contents of stored data are not lost even when power is shut due to, for example, a power failure or a moving of the digital MFP 20.

An image memory 8 is a DRAM or the like. The image memory 8 stores transmission image data, received image data or scanned and converted image data. The image memory 8 includes a memory box area 8*a* sectioned into a plurality of memory boxes according to a number of a plurality of client PCs 30 or users of the client PCs 30. Each client PC 30 transfers and temporarily stores in a corresponding memory box, image data transmitted or received by the facsimile function, image data scanned and converted by the scanner function or the copying function, or image data when using the printer function. When reading image data from the memory box, the client PC 30 transmits a transfer instruction request signal to the digital MFP 20. Then, the client PC 30 reads the image data from the corresponding memory box of the digital MFP 20 and the image data is transferred to the client PC 30. A hard disk drive 9 is a storage device including a recording medium and stores various data and programs.

A fax modem 10 is connected to the public telephone line L. The fax modem 10 includes functions of a fax modem for general facsimile communication. A Network Control Unit (NCU) 11 carries out an operation for making and braking a direct current loop or the like of the analog public telephone line L. The NCU 11 is a hardware circuit including an automatic dial function and connects the fax modem 10 to the public telephone line L according to necessity. The NCU 11 carries out a detection of an ID receiving terminal actuation signal of a caller ID notification service and a general call indication signal. In addition, according to necessity, the NCU 11 can transmit a primary response signal and a secondary response signal in the caller ID notification service. Further, the NCU 11 may be connected to a digital communication line (for example, an Integrated Services Digital Network (ISDN) line) of a baseband transmission system via a prescribed terminal adaptor and a Digital Service Unit (DSU).

A LAN interface 12 is connected to the LAN 70 and receives a signal and data from the LAN 70. Meanwhile, the LAN interface 12 executes an interface process relating to LAN communication, such as a signal conversion and a protocol conversion, by transmitting a signal and data to the LAN 70. In the present preferred embodiment, the digital MFP 20 is connected from the LAN interface 12 via the LAN 70, the router 60 and the Internet 90 to the center device 40. The digital MFP 20 transmits a failure notification signal or a center calling signal to the center device 40. The digital MFP 20 receives a calling key lighting instruction signal for a remote control from the center device 40 via the Internet 90.

According to the facsimile communication function of the digital MFP 20 described above, the dotted image data transferred from each of the client PCs 30-1 through 30-N or the dotted image data scanned by the image scanning unit 2 is encoded by software in accordance with an encoding scheme, such as the Modified Huffman (MH), the Modified Relative element address designate (MR) and the Modified MR (MMR), defined in a facsimile communication standard. Then, the image data is transmitted to a destination facsimile machine, for example, the digital MFP 20A. Meanwhile, the encoded data received from the digital MFP 20A, which is the destination facsimile machine, is decoded into image data by software and stored in the image memory 8. Then, the decoded data is printed out from the image printing unit 3 according to necessity.

Figure 3:
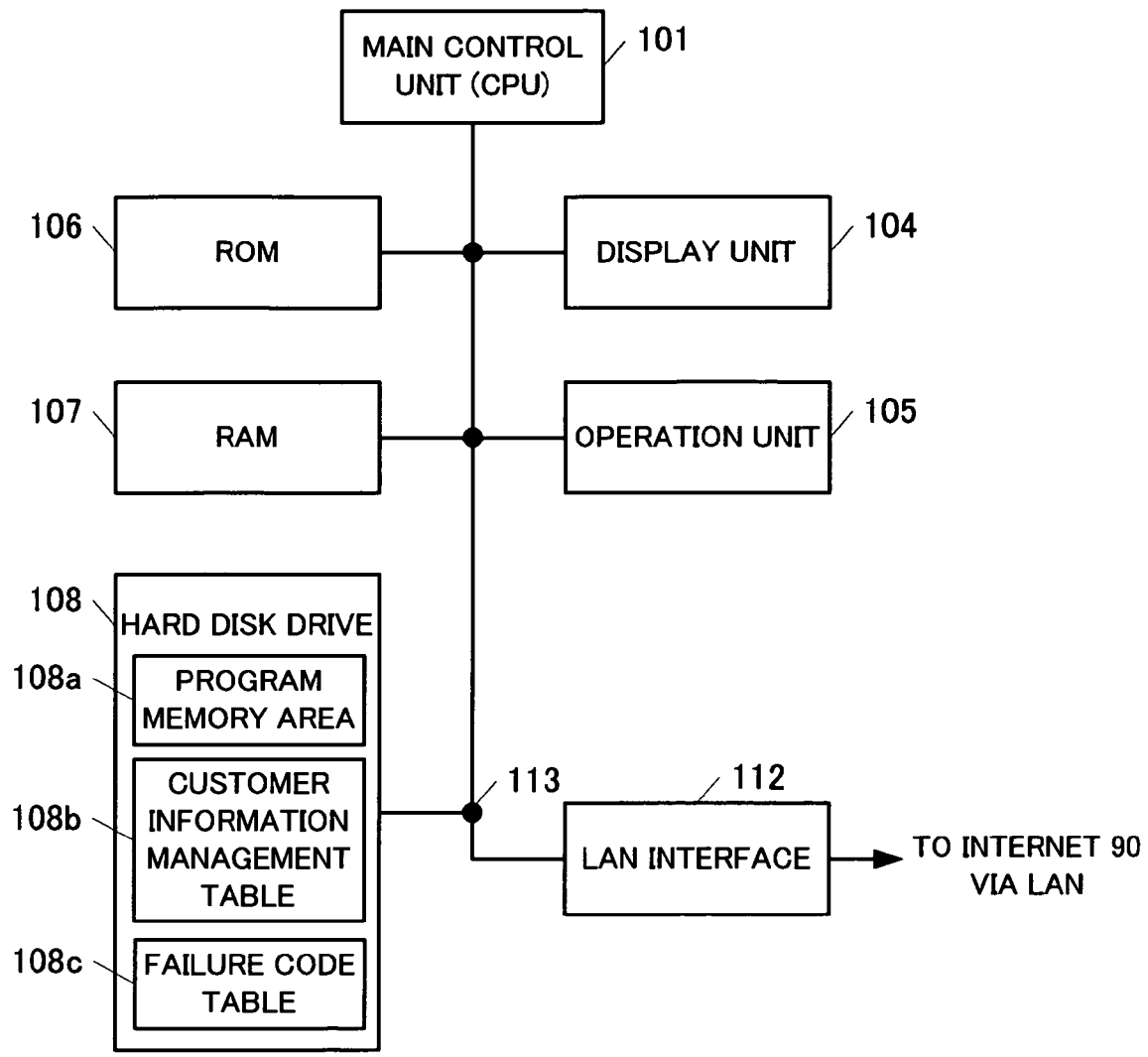
FIG. 3 is a block diagram illustrating a configuration of the center device of FIG. 1.

FIG. 3 is a block diagram illustrating a configuration of the center device 40 of FIG. 1. The center device 40 is, for example, a PC.

In FIG. 3, a main control unit 101 is specifically a CPU. The main control unit 101 is connected to each of following hardware components via a bus 113 and controls each of the hardware components. In addition, the main control unit 101 executes various software functions to be described later. In the center device 40, an image scanning unit and an image printing unit (not illustrated) are optional. A display unit 104 is a display device such as a LCD or a CRT display. The display unit 104 displays an operation state of the center device 40. The display unit 104 also displays image data of a transmission original document and received image data. For example, an operation unit 105 is a keyboard and used for entering character data and an instruction command.

A ROM 106 previously stores various software programs necessary for an operation of the center device 40 and executed by the main control unit 101. The RAM 107 includes an SRAM, a DRAM, a SDRAM or the like. The RAM 107 is used as a working area of the main control unit 101 and stores temporary data that generates at an execution of a program. A hard disk drive 108 is a storage device including a recording medium. For example, the hard disk drive 108 includes a program memory area 108a storing a software program or the like for a remote control of the digital MFP 20 executed by the main control unit 101. The program memory area 108a includes at least a program for a failure notification signal receiving process of FIG. 6 and a program for a center calling signal receiving process of FIG. 7. The hard disk drive 108 further includes a customer information management table 108b and a failure code table 108c. For each customer of the digital MFP 20, the customer information management table 108b stores a name of a customer possessing the digital MFP 20, a customer management number, a global IP address, a telephone number for a voice communication by the SIP or the public communication network, the device information, and information relating to whether or not a calling key validation mode is set. The failure code table 108c stores failure contents, a cause and an analysis method or the like for each failure code assigned to each failure content of the digital MFP 20.

The calling key validation mode is a mode in which the center device 40 responds to the failure notification signal from the digital MFP 20 and automatically transmits the calling key lighting instruction signal to the digital MFP 20 with the failure. When the process of the calling key validation mode is executed and the user of the digital MFP 20 presses the calling key 5a, as to be described in detail hereinafter, the user of the digital MFP 20 can communicate with the operator of the center device 40 regarding the failure.

A LAN interface 112 is connected to the router device 60 of FIG. 1 via the LAN and the Internet 90.

Figure 5:
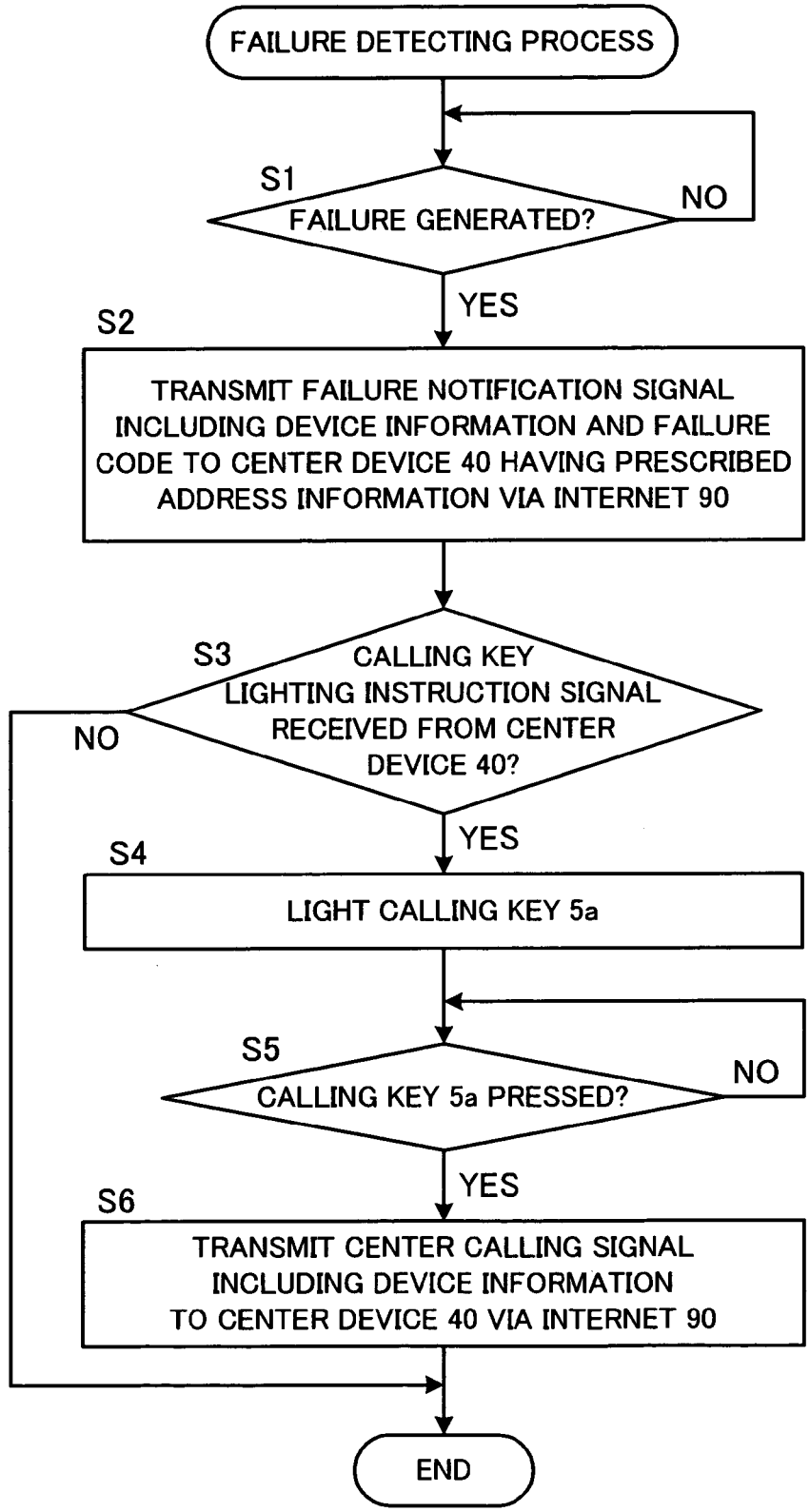
FIG. 5 is a flowchart illustrating a failure detecting process executed by a main control unit of the digital MFP of FIG. 2.

FIG. 5 is a flowchart illustrating a failure detecting process executed by the main control unit 1 of the digital MFP 20 of FIG. 2.

In FIG. 5, a determination is carried out at step S1 as to whether or not a failure has generated. Until a determination of YES is made at step S1, the process of step S1 is repeated. When a determination of YES is made at step S1, the process proceeds onto step S2. At step S2, a failure notification signal including device information and a failure code is transmitted to the center device 40 having the known address information. Then, at step S3, a determination is carried out as to whether or not a calling key lighting instruction signal has been received from the center device 40. When a determination of YES is made at step S3, the process proceeds onto step S4. Meanwhile, when a determination of NO is made at step S3, the failure detecting process ends. Next, at step S4, the LED of the calling key 5a is lighted (or a buzzer is sounded) to notify the digital MFP 20 to call the user. Then, at step S5, a determination is carried out as to whether or not the calling key 5a has been pressed. Further, the calling key 5a is pressed when the user of the digital MFP 20 wishes to communicate with the operator of the center device 40 regarding the failure. Until a determination of YES is made at step S5, the process of step S5 is repeated. When a determination of YES is made at step S5, the process proceeds onto step S6. At step S6, a center calling signal including the device information is transmitted to the center device 40 via the Internet 90. Then, the failure detecting process ends.

Figure 6:
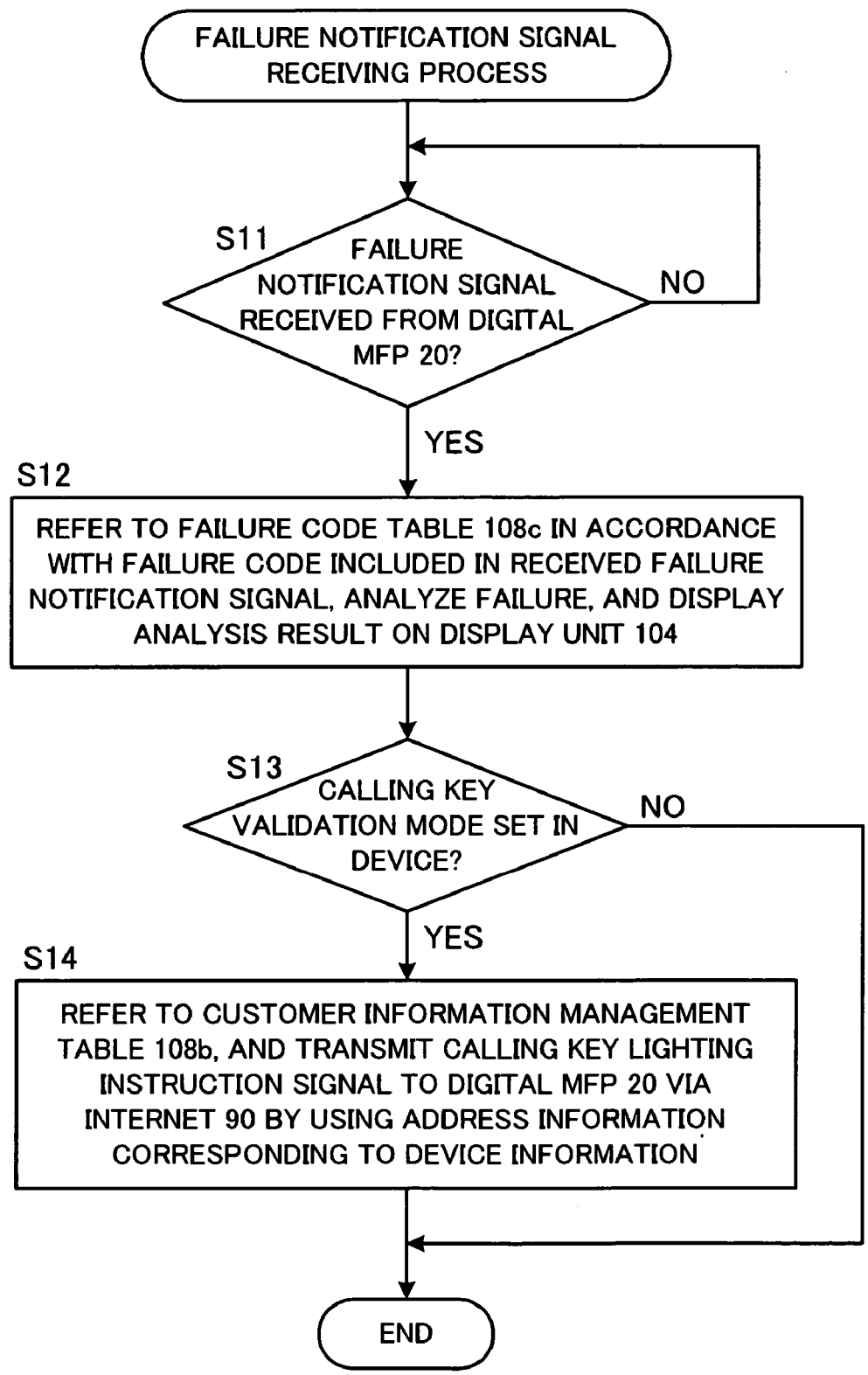
FIG. 6 is a flowchart illustrating a failure notification signal receiving process executed by a main control unit of the center device of FIG. 3.

FIG. 6 is a flowchart illustrating a failure notification signal receiving process executed by the main control unit 101 of the center device 40 of FIG. 3.

In FIG. 6, a determination is carried out at step S11 as to whether or not a failure notification signal has been received from the digital MFP 20. Until a determination of YES is made at step S11, the process of step S11 is repeated. When a determination of YES is made at step S11, the process proceeds onto step S12. At step S12, in accordance with a failure code included in the received failure notification signal, the main control unit 101 of the center device 40 refers to the failure code table 108c. The main control unit 101 analyzes the failure and displays an analysis result on the display unit 104. Next, at step S13, the customer information management table 108b is referenced and a determination is carried out as to whether or not the calling key validation mode is set with respect to a device of the customer. When a determination of YES is made at step S13, the process proceeds onto step S14. When a determination of NO is made at step S13, the failure notification signal receiving process ends. At step S14, the customer information management table 108b is referenced and a calling key lighting instruction signal is transmitted to the digital MFP 20 via the Internet 90 by using the address information corresponding to the device information. Then, the failure notification signal receiving process ends.

Figure 7:
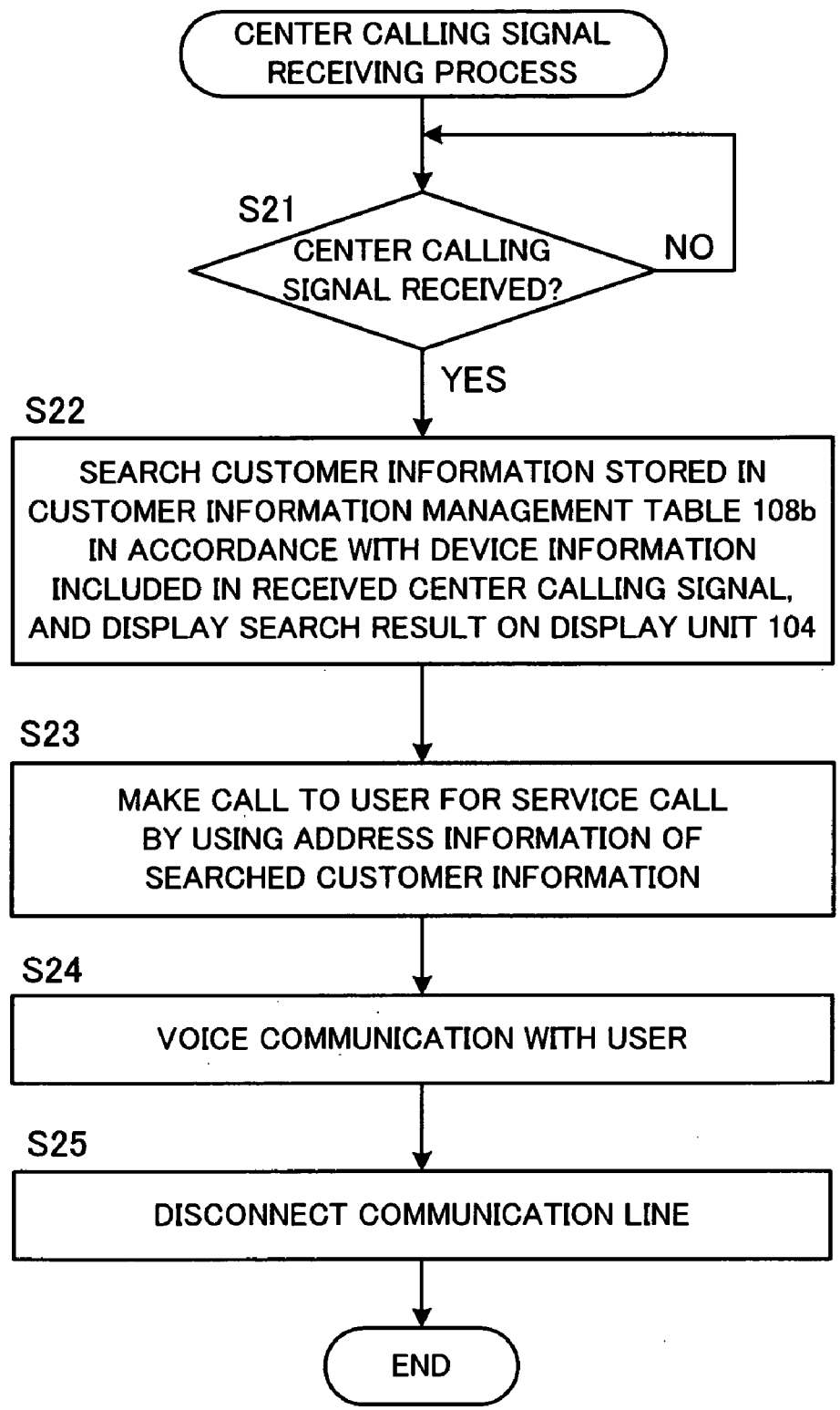
FIG. 7 is a flowchart illustrating a center calling signal receiving process executed by the main control unit of the center device of FIG. 3.

FIG. 7 is a flowchart illustrating a center calling signal receiving process executed by the main control unit 101 of the center device 40 of FIG. 3.

In FIG. 7, a determination is carried out at step S21 as to whether or not a center calling signal has been received from the digital MFP 20. Until a determination of YES is made at step S21, the process of step S21 is repeated. When a determination of YES is made at step S21, the process proceeds onto step S22. At step S22, the main control unit 101 of the center device 40 searches the customer information stored in the customer information management table 108b in accordance with the device information included in the received center calling signal, and displays a search result on the display unit 104. Next, at step S23, a call is originated by the SIP via the Internet 90 to the user of the digital MFP 20 for a service call by using address information of the searched customer information. At step S24, the operator of the center device 40 communicates with the user of the digital MFP 20. At step S25, the communication line to the digital MFP 20 is opened. Then, the center calling signal receiving process ends.

As described above, according to the first preferred embodiment of the present invention, the center device 40 responds to the failure notification signal including the device information transmitted from the digital MFP 20. The center device 40 refers to the customer information management table 108b and searches the address information corresponding to the device information. Then, the center device 40 automatically transmits a call instruction signal via the Internet 90 to the digital MFP 20 having the searched address information. In response to the call instruction signal, the digital MFP 20 lights the calling key 5a of the operation unit 5 of FIG. 4 and/or sounds a buzzer to notify the call to the user. Thus, a call can be made automatically from the center device 40 to the user of the digital MFP 20 with the failure.

After the digital MFP 20 notifies the call to the user, the digital MFP 20 automatically transmits a center calling signal via the Internet 90 to the center device 40 in accordance with an instruction of the user made by, for example, pressing the calling key 5a of the operation unit 5. Therefore, a call can be made automatically to an operator of a center device in accordance with an instruction of a user of a communication terminal device with regard to a call made from the center device to the user of the communication terminal device.

The center device 40 responds to the center calling signal including the device information from the digital MFP 20. The center device 40 refers to the customer information management table 108b and searches the address information corresponding to the device information. The center device 40 automatically originates a call via the Internet 90 to the digital MFP 20 having the searched address information. Accordingly, voice communication can be carried out between the center device 40 and the digital MFP 20 by the SIP, for example. The user of the digital MFP 20 can communicate with the operator of the center device 40 regarding the failure.

(Second Preferred Embodiment) A description will be made of a second preferred embodiment of the present invention with reference to the drawings. In the second preferred embodiment, like reference numeral is assigned to like constituent element.

Figure 8:
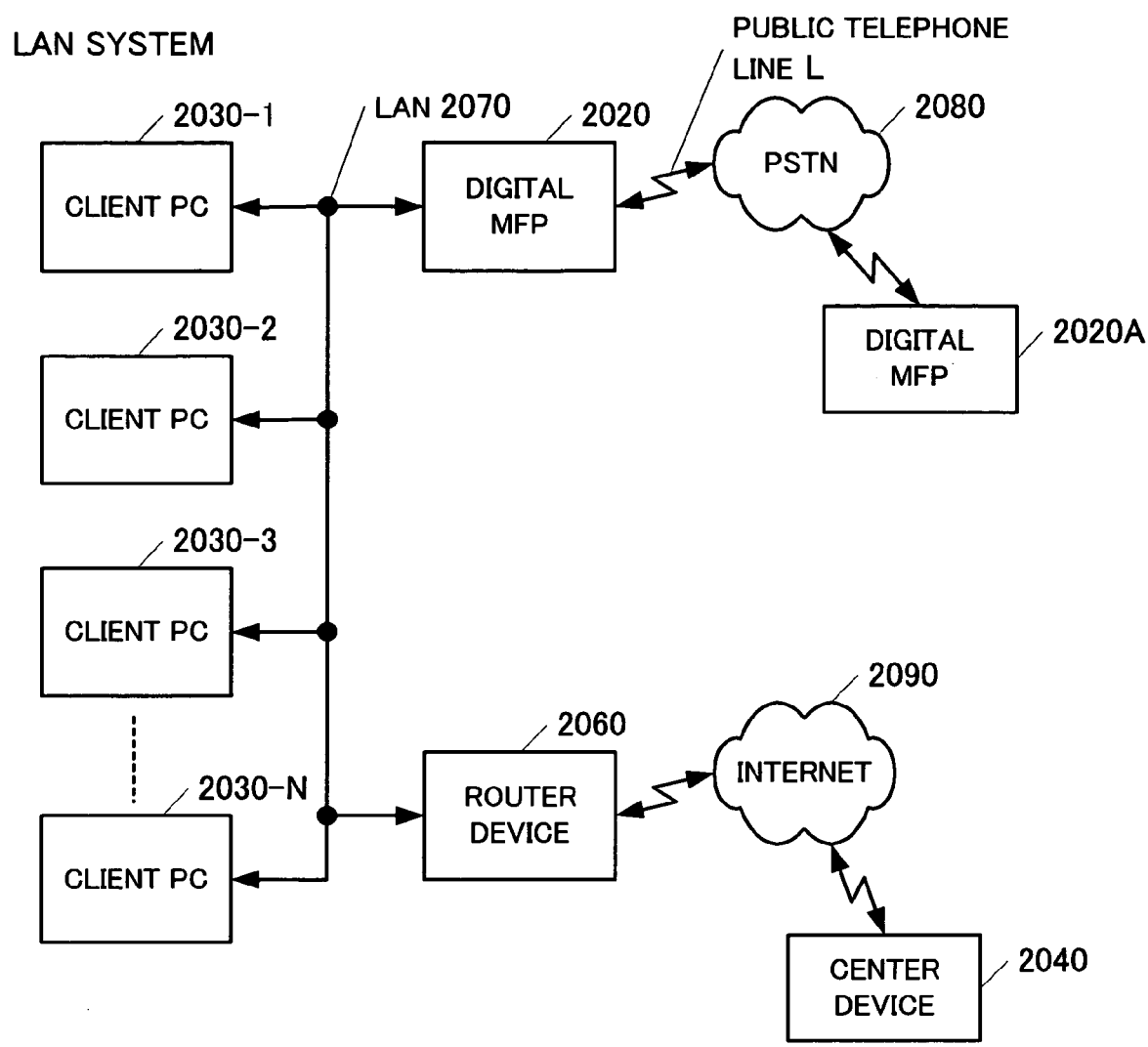
FIG. 8 is a block diagram illustrating a configuration of a LAN system, including a digital MFP as a facsimile machine with a copying function, a printer function and a scanner function, and a remote maintenance system in which the digital MFP is connected to a center device via the Internet, according to a second preferred embodiment of the present invention.

FIG. 8 is a block diagram illustrating a configuration of a LAN system, including a digital MFP 2020 as a facsimile machine with a copying function, a printer function and a scanner function, and a remote maintenance system in which the digital MFP 2020 is connected to a center device 2040 via the Internet 2090, which is an IP network, according to the second preferred embodiment of the present invention.

In the LAN system according to the second preferred embodiment, N client PCs 2030-1 through 2030-N (hereinafter collectively referred to as a "client PC 2030"), the digital MFP 2020 and a router device 2060 are connected via a LAN 2070. The digital MFP 2020 is connected to a PSTN 2080 via a public telephone line L. The router device 2060 is connected to the Internet 2090. Each client PC 2030 is connected to the Internet 2090 via the router device 2060 or a mail server device (not illustrated). Accordingly, each client PC 2030 can browse a webpage and transmit and/or receive electronic mail. By accessing the digital MFP 2020, each client PC 2030 can use each of the copying function, the printer function, the scanner function and the facsimile function of the digital MFP 2020.

Figure 11:
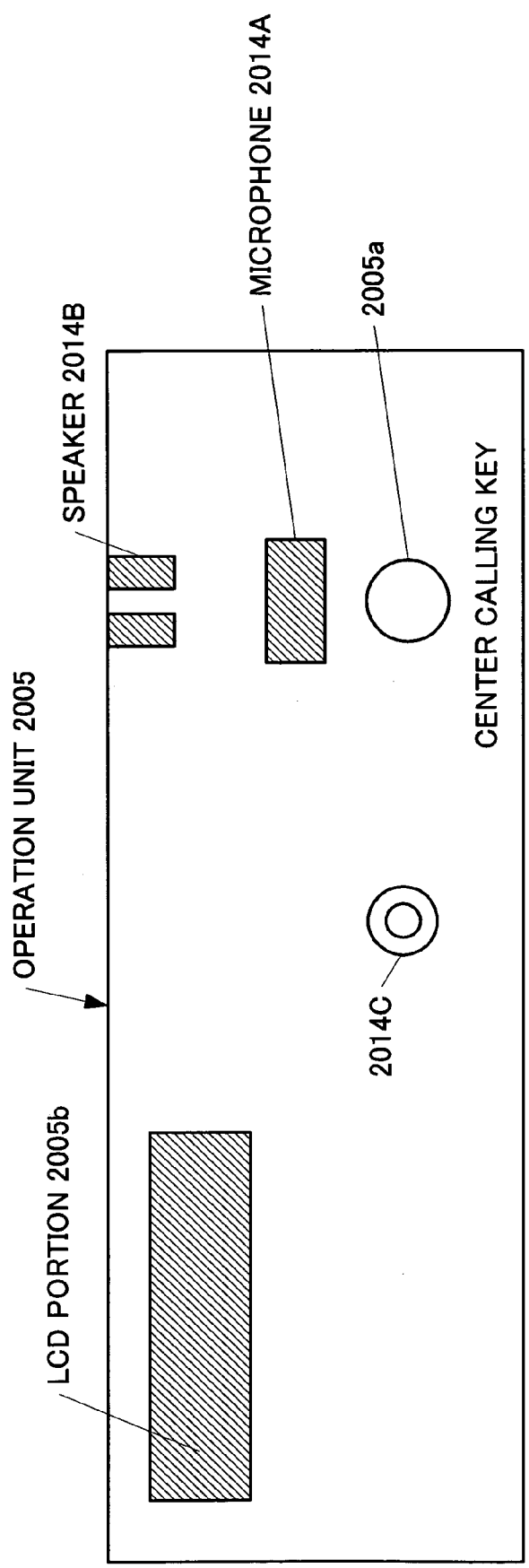
FIG. 11 is a front view illustrating an operating surface of an operation unit of the digital MFP of FIG. 9.

For example, the digital MFP 2020, which is a communication terminal device according to the second preferred embodiment, carries out facsimile communication with another digital MFP 2020A via the PSTN 2080. The digital MFP 2020 is connected to the center device 2040 via the router device 2060 and the Internet 2090. Further, the center device 2040 remotely controls the digital MFP 2020. A center calling key 2005a is arranged on an operation surface of an operation unit 2005 for calling an operator of the center device 2040 located at a maintenance service center (FIG. 11). When the center calling key 2005a has been pressed (YES at step S2001 of FIG. 12), a main control unit 2001 of the digital MFP 2020 transmits a center calling signal including device information of the digital MFP 2020 (for example, includes information such as a model number, a serial number and a customer management number, and the information is previously stored in a device information table 2007a in a RAM 2007) via the Internet 2090 to the center device 2040 (step S2002). In addition, a voice communication session is established between the center device 2040 and the digital MFP 2020 via the Internet 2090 (step S2003). The user of the digital MFP 2020 communicates with the operator of the center device 2040 regarding a failure, an operation method or the like of the digital MFP 2020 by using (a) a microphone 2014A and a speaker 2014B, or by using (b) an earphone with a microphone (not illustrated; or may be a microphone and a speaker or the like) connected to a connecting terminal 2014C (step S2004). Further, the microphone 2014A and the speaker 2014B are arranged on the operation unit 2005 for communicating with the operator of the center device 2040. The connecting terminal 2014C is arranged on the operation unit 2005 and connects the earphone with the microphone for communicating with the operator of the center device 2040.

The client PC 2030 of FIG. 8 is a remote terminal device, for example, a known PC. The client PC 2030 executes a process of generating, recording and storing or the like of image data and/or character data. In the second preferred embodiment, as one example, the client PC 2030 is a remote terminal device which receives image data scanned by a scanner. Alternatively, the client PC 2030 is an information processing device which carries out facsimile transmission of image data of an original document image generated by the client PC 2030 (for example, image data of an original document created by software of a word processor) to a destination communication terminal device, such as a facsimile machine or a digital MFP, via the digital MFP 2020.

Figure 9:
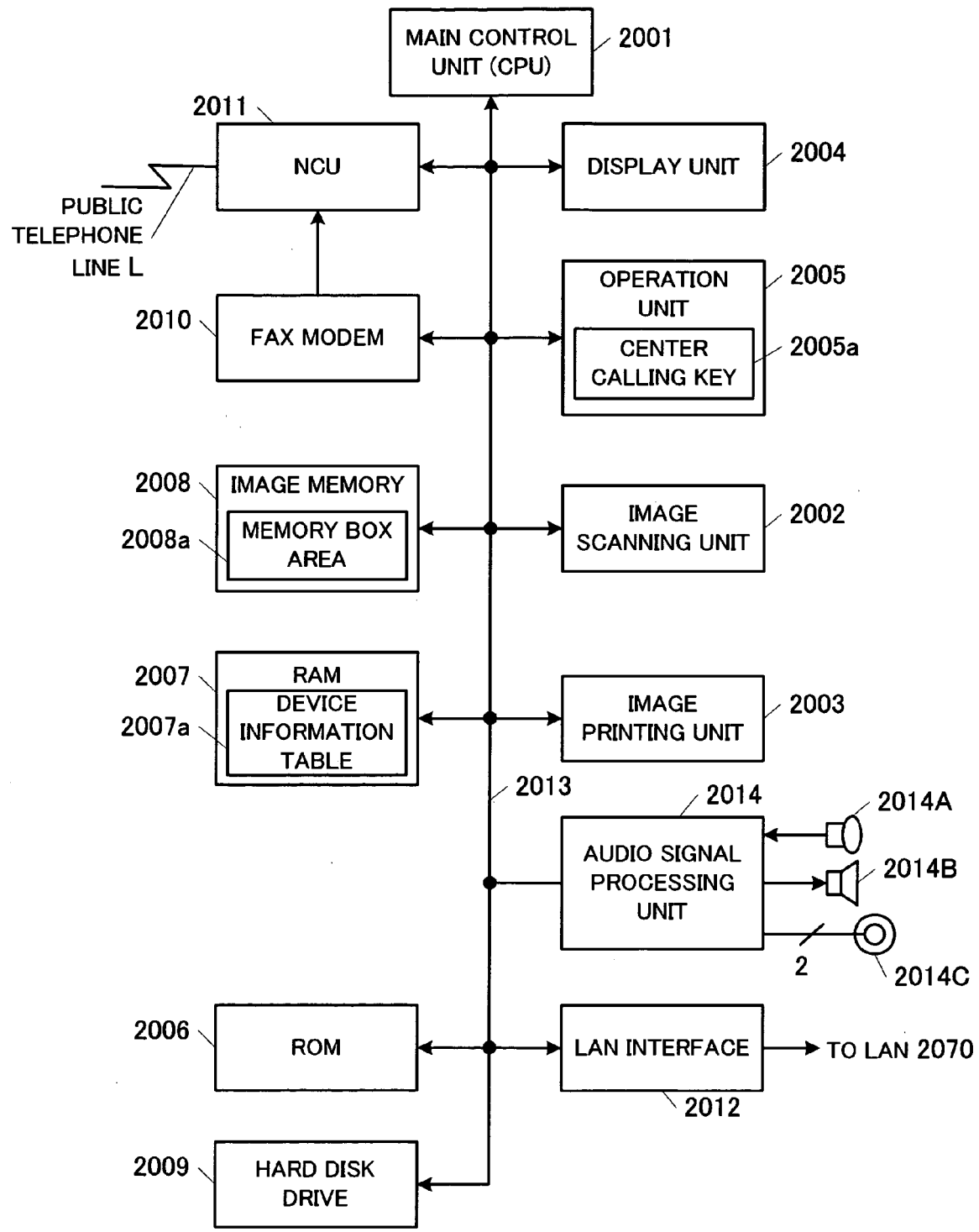
FIG. 9 is a block diagram illustrating a configuration of the digital MFP of FIG. 8.

FIG. 9 is a block diagram illustrating a configuration of the digital MFP 2020 of FIG. 8.

In FIG. 9, the digital MFP 2020 includes a copying function, a printer function and a scanner function in addition to a conventional G3 facsimile communication function. A main control unit 2001 is specifically a CPU. The main control unit 2001 is connected to each of following hardware components via a bus 2013 and controls each of the hardware components. In addition, the main control unit 2001 executes various software functions described hereinafter. An image scanning unit 2002 scans an original document by a scanner using a CCD or the like. The image scanning unit 2002 outputs dotted image data converted in a binary of black and white. An image printing unit 2003 is an electrophotographic printer device, for example. The image printing unit 2003 prints out as a hardcopy, image data scanned and converted by the image scanning unit 2002 and image data received from another facsimile machine in facsimile communication. The image printing unit 2003 also prints out character data.

A display unit 2004 is a display device such as a LCD or a CRT display. The display unit 2004 displays an operation status of the digital MFP 2020. The display unit 2004 also displays image data of a transmission original document and received image data. The operation unit 2005 includes character keys, a ten-key numeric pad for dialing, speed dial keys, one-touch dial keys and various function keys necessary for operating the digital MFP 2020. As illustrated in FIG. 11, the operation unit 2005 includes an LCD portion 2005*b* as the display unit 2004 and the center calling key 2005*a*. Further, the LCD portion 2005*b* is arranged in a left portion of the operation unit 2005, and the center calling key 2005*a* is arranged in a right portion of the operation unit 2005 for calling the operator of the center device 2040 located at the maintenance service center. The microphone 2014A and the speaker 2014B are arranged to an upper side of the center calling key 2005*a*. The connecting terminal 2014C is arranged to the left of the center calling key 2005*a* and connects the earphone with the microphone (not illustrated; or may be a microphone and a speaker or the like) for communicating with the operator of the center device 2040. That is, in place of the microphone 2014A and the speaker 2014B, for example, a connecting plug of the earphone with the microphone or the like may be inserted and connected in the connecting terminal 2014C. Further, by forming the display unit 2004 as a touch screen, a part or all of various keys of the operation unit 2005 may be substituted.

A ROM 2006 previously stores various software programs necessary for an operation of the digital MFP 2020 and executed by the main control unit 2001. In the present preferred embodiment, the ROM 2006 stores at least a program for a center calling process illustrated in FIG. 12. The RAM 2007 includes an SRAM, a DRAM, an SDRAM or the like. The RAM 2007 is used as a working area of the main control unit 2001 and stores temporary data that generates at an execution of a program. The RAM 2007 stores a device information table 2007*a* and temporarily stores a password entered by the user. The device information table 2007*a* stores a model number, a serial number and a customer management number of the digital MFP 2020, and device information of the center device 2040. For example, the device information of the center device 2040 is a global IP address, or an IP telephone number for establishing a voice communication session using the SIP. Further, when a flash memory is used as the RAM 2007, contents of stored data are not lost even when power is shut due to, for example, a power failure or a moving of the digital MFP 2020.

An image memory 2008 is a DRAM or the like. The image memory 2008 stores transmission image data, received image data or scanned and converted image data. The image memory 2008 includes a memory box area 2008*a* sectioned into a plurality of memory boxes according to a number of a plurality of client PCs 2030 or users of the client PCs 2030. Each client PC 2030 transfers and temporarily stores in a corresponding memory box, image data transmitted or received by the facsimile function, image data scanned and converted by the scanner function or the copying function, or image data when using the printer function. When reading from the memory box, the client PC 2030 transmits a transfer instruction request signal to the digital MFP 2020. Then, the client PC 2030 reads image data from the corresponding memory box, and the image data is transferred to the client PC 2030. A hard disk drive 2009 is a storage device including a recording medium and stores various data and programs.

A fax modem 2010 is connected to the public telephone line L, and includes functions of a fax modem for general facsimile communication. A NCU 2011 carries out an operation for making and braking a direct current loop or the like of the analog public telephone line L. The NCU 2011 is a hardware circuit including an automatic dial function and connects the fax modem 2010 to the public telephone line L according to necessity. The NCU 2011 carries out a detection of an ID receiving terminal actuation signal of a caller ID notification service and a general call indication signal. In addition, according to necessity, the NCU 2011 can transmit a primary response signal and a secondary response signal in the caller ID notification service. Further, the NCU 2011 may be connected to a digital communication line (for example, an ISDN line) of a baseband transmission system via a prescribed terminal adaptor and a (DSU).

A LAN interface 2012 is connected to the LAN 2070 and receives a signal and data from the LAN 2070. Meanwhile, the LAN interface 2012 executes an interface process relating to LAN communication, such as a signal conversion and a protocol conversion, by transmitting a signal and data to the LAN 2070. In the present preferred embodiment, the digital MFP 2020 is connected from the LAN interface 2012 via the LAN 2070, the router 2060 and the Internet 2090 to the center device 2040. The digital MFP 2020 receives a data reading instruction signal and a data writing instruction signal for a remote control from the center device 2040 via the Internet 2090.

The microphone 2014A, the speaker 2014B and the connecting terminal 2014C are connected to an audio signal processing unit 2014. When a voice communication session is established between the digital MFP 2020 and the center device 2040, an analog audio signal input from the microphone 2014A or the microphone connected to the connecting terminal 2014C is converted into a digital audio signal. The digital MFP 2020 transmits the converted digital audio signal via the LAN interface 2012 and the Internet 2090 to the center device 2040. Meanwhile, the digital MFP 2020 converts a digital audio signal transmitted from the center device 2040 via the Internet 2090 and the LAN interface 2012 into an analog audio signal. The digital MFP 202 outputs the converted analog audio signal from the speaker 2014B or a speaker or an earphone connected to the connecting terminal 2014C. Accordingly, the user of the digital MFP 2020 can communicate with the operator of the center device 2040. Further, in the preferred embodiment illustrated in FIG. 9, the audio signal processing unit 2014 is hardware. However, the audio signal processing unit 2014 may be a software program capable of being executed by the main control unit 2001.

According to the facsimile communication function of the digital MFP 2020 described above, the dotted image data transferred from each of the client PCs 2030-1 through 2030-N or the dotted image data scanned by the image scanning unit 2002 is encoded by software in accordance with an encoding scheme such as the MH, the MR and the MMR defined in the facsimile communication standard. Then, the image data is transmitted to a destination facsimile machine, for example, the digital MFP 2020A. Meanwhile, the encoded data received from the digital MFP 2020A, which is the destination facsimile machine, is decoded into image data by software and stored in the image memory 2008. The decoded data is printed out from the image printing unit 2003 according to necessity.

Figure 10:
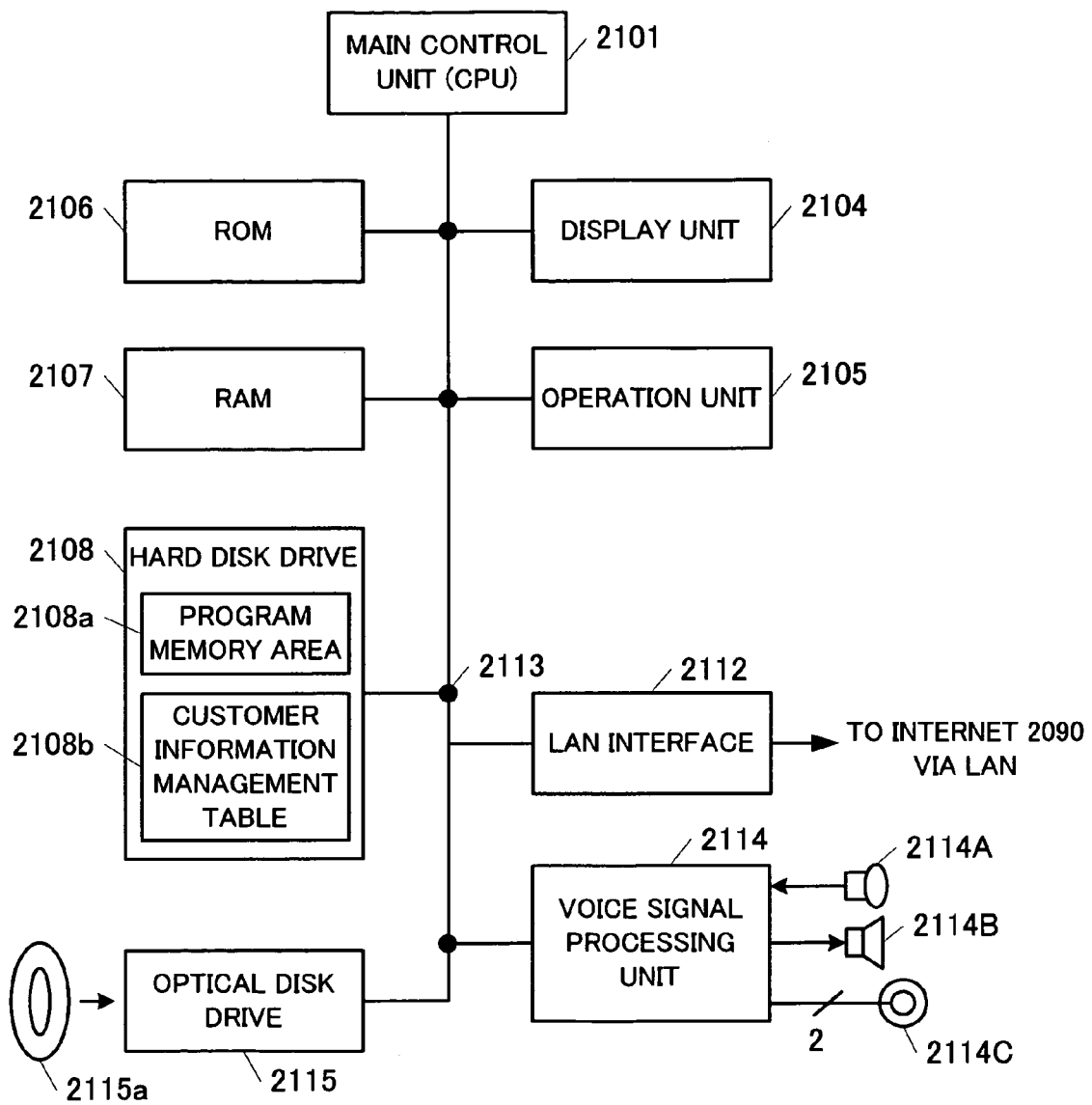
FIG. 10 is a block diagram illustrating a configuration of the digital MFP of FIG. 8.

FIG. 10 is a block diagram illustrating a configuration of the center device 2040 of FIG. 8. For example, the center device 2040 is a PC.

In FIG. 10, a main control unit 2101 is specifically a CPU. The main control unit 2101 is connected to each of following hardware components via a bus 2113 and controls each of the hardware components. In addition, the main control unit 2101 executes various software functions to be described later. In the center device 2040, an image scanning unit and an image printing unit (not illustrated) are optional. A display unit 2104 is a display device such as a LCD or a CRT display. The display unit 2104 displays an operation state of the center device 2040. The display unit 2104 also displays image data of a transmission original document and received image data. For example, an operation unit 2105 is a keyboard and used for entering character data and an instruction command.

A ROM 2106 previously stores various software programs necessary for an operation of the center device 2040 and executed by the main control unit 2101. The RAM 2107 includes an SRAM, a DRAM, an SDRAM or the like. The RAM 2107 is used as a working area of the main control unit 2101 and stores temporary data that generates at an execution of a program. A hard disk drive 2108 is a storage device including a recording medium. For example, the hard disk drive 2108 includes a program memory area 2108a and a customer information management table 2108b. The program memory area 2108a stores a software program or the like for a remote control of the digital MFP 2020 executed by the main control unit 2101. The program memory area 2108a stores a program for a center called process illustrated in FIG. 13 according to the second preferred embodiment and a program for a center called process illustrated in FIG. 14 according to a third preferred embodiment. For each customer of the digital MFP 2020, the customer information management table 2108b stores customer information. For example, the customer information includes a customer name, a model number and a serial number of the digital MFP 2020, a global IP address or an IP telephone number for making a call by the SIP, a failure history of the digital MFP 2020, and a communication time and an audio file (relating to the third preferred embodiment) of voice communication carried out with the user of the digital MFP 2020 at a generation of the failure. Alternatively, for each index customer management information, the customer information management table 2108b may store item information different from the information of the digital MFP 2020 and the index customer management information.

A LAN interface 2112 is connected to the router device 2060 of FIG. 8 via the LAN and the Internet 2090. A microphone 2114A, a speaker 2114B, and a connecting terminal 2114C similar to the connecting terminal 2014C of the digital MFP 2020 are connected to an audio signal processing unit 2114. When a voice communication session is established between the center device 2040 and the digital MFP 2020, an analog audio signal input from the microphone 2114A or the microphone connected to the connecting terminal 2114C is converted into a digital audio signal. Then, the center device 2040 transmits the converted digital audio signal via the LAN interface 2112 and the Internet 2090 to the digital MFP 2020. Meanwhile, the center device 2040 converts the digital audio signal transmitted from the digital MFP 2020 via the Internet 2090 and the LAN interface 2112 into an analog audio signal. Then, the center device 2040 outputs the converted analog audio signal to the speaker 2114B or the speaker or the earphone connected to the connecting terminal 2114C. Accordingly, the operator of the center device 2040 can communicate with the user of the digital MFP 2020. Further, in the preferred embodiment illustrated in FIG. 10, the audio signal processing unit 2114 is hardware. Alternatively, the audio signal processing unit 2114 may be software program capable of being executed by the main control unit 2101.

An optical disk 2115a is inserted in an optical disk drive 2115. The optical disk 2115a is a recording medium readable by a computer. For example, the optical disk 2115a is a Compact Disc Read Only Memory (CD-ROM), a Compact Disc Recordable (CD-R), a CD-ReWritable (CD-RW), or a Digital Versatile Disk—Read Only Memory (DVD-ROM). The optical disk 2115a previously stores a program for the center called process. The program data for the center called process stored in the optical disk 2115a is loaded from the optical disk drive 2115 via the bus 2113 to the program memory area 2108a of the hard disk drive 2108. The process of such a program may be executed by the main control unit 2101.

Figure 12:
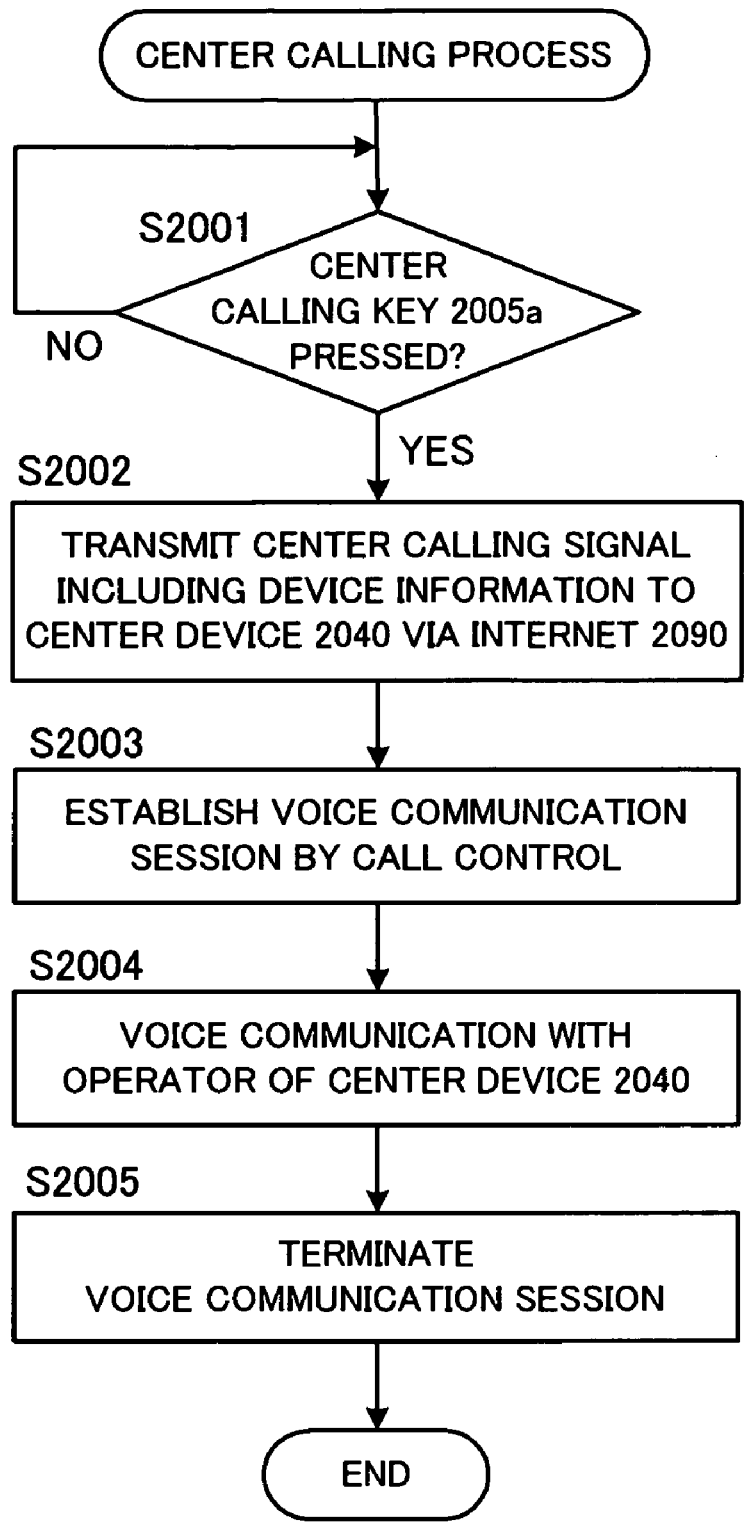
FIG. 12 is a flowchart illustrating a center calling process executed by a main control unit of the digital MFP of FIG. 9.

FIG. 12 is a flowchart illustrating a center calling process executed by the main control unit 2001 of the digital MFP 2020 of FIG. 9.

At step S2001, a determination is carried out as to whether or not the center calling key 2005a has been pressed. Until a determination of YES is made at step S2001, the process of step S2001 is repeated. When a determination of YES is made at step S2001, the process proceeds onto step S2002. At step S2002, the center calling signal including the device information of the digital MFP 2020 is transmitted via the Internet 2090 to the center device 2040. At step S2003, in accordance with a call control calling signal from the center device 2040, a voice communication session is established between the digital MFP 2020 and the center device 2040 by a call control such as the SIP. Accordingly, at step S2004, the user of the digital MFP 2020 can communicate with the operator of the center device 2040 via the Internet 2090 by using the Voice over IP (VoIP). When the voice communication ends, the voice communication session is opened at step S2005 and the center calling process ends.

Figure 13:
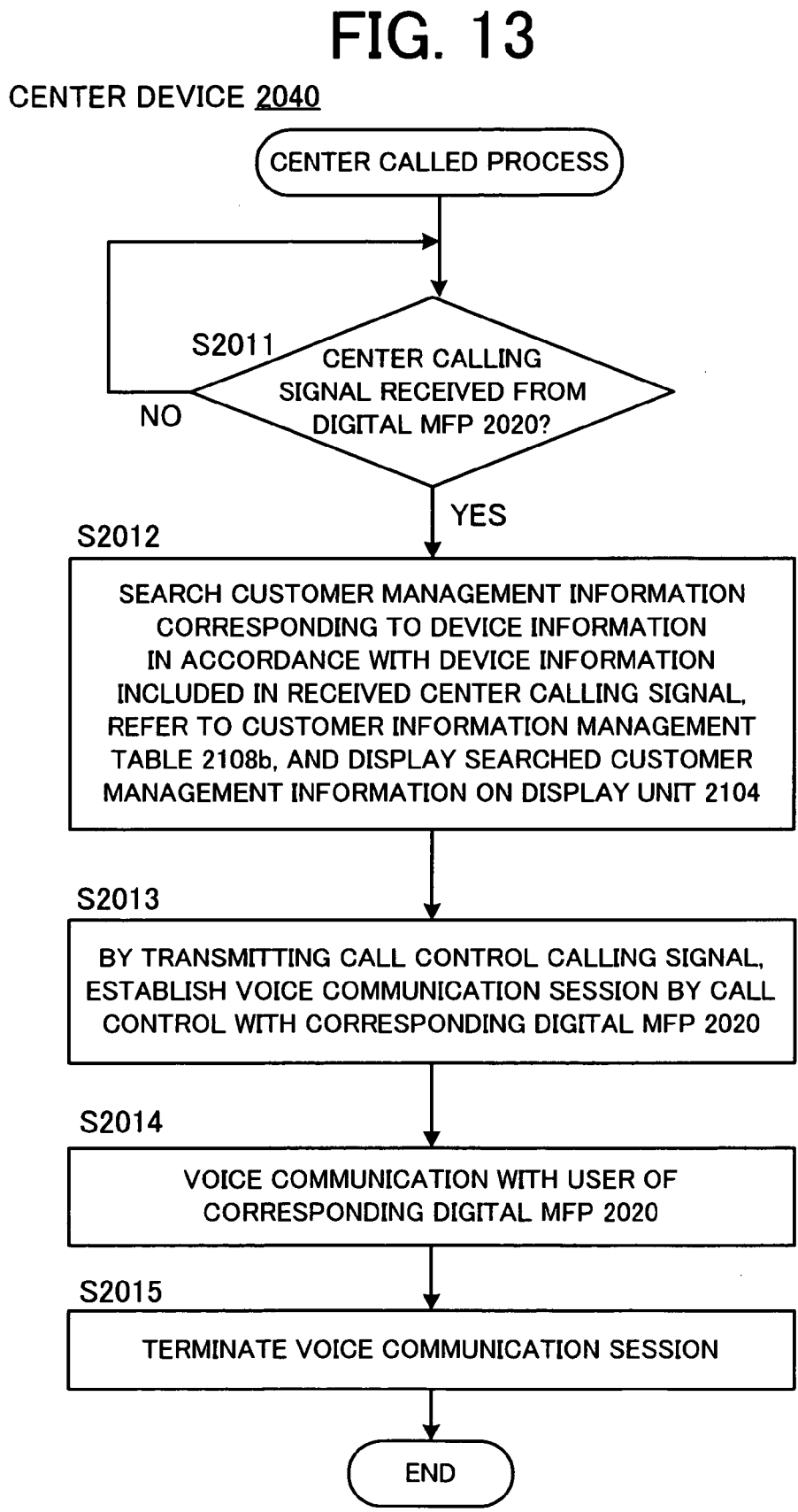
FIG. 13 is a flowchart illustrating a center called process executed by the main control unit of the center device of FIG. 10 according to the second preferred embodiment of the present invention.

FIG. 13 is a flowchart illustrating a center called process executed by the main control unit 2101 of the center device 2040 of FIG. 10.

At step S2011, a determination is carried out as to whether or not a center calling signal has been received. Until a determination of YES is made at step S2011, the process of step S2011 is repeated. When a determination of YES is made at step S2011, the process proceeds onto step S2012. At step S2012, the main control unit 2101 of the center device 2040 refers to the customer information management table 2108b in accordance with the device information included in the received center calling signal, and searches customer management information corresponding to the device information. Then, the searched customer information is displayed on the display unit 2104 to notify the operator of the center device 2040. At step S2013, the main control unit 2101 of the center device 2040 transmits a call control calling signal in accordance with the searched customer management information to establish a voice communication session between the center device 2040 and the corresponding digital MFP 2020 by a call control such as the SIP, for example. Accordingly, at step S2014, the operator of the center device 2040 can communicate with the user of the digital MFP 2020 via the Internet 2090 by using the VOIP while confirming the corresponding customer management information displayed on the display unit 2014. When the voice communication ends, the voice communication session is opened at step S2015 and the center called process ends.

As described above, according to the digital MFP 2020 of the second preferred embodiment of the present invention, when the center calling key 2005*a* of the operation unit 2005 has been pressed (YES at step S2001 of FIG. 12), the main control unit 2001 transmits a center calling signal including the device information of the digital MFP 2020 to the center device 2040 via the Internet 2090 (step S2002). In addition, the main control unit 2001 establishes a voice communication session between the center device 2040 and the digital MFP 2020 via the Internet 2090 (step S2003). Accordingly, the user of the digital MFP 2020 can communicate with the operator of the center device 2040 regarding a failure and an operation method or the like of the digital MFP 2020 (step S2004). Therefore, when a trouble generates in a communication terminal device in a remote maintenance system, a user of the communication terminal device can easily and economically communicate with an operator of a center device as if using an interphone in accordance with a prescribed operation performed by the user of the communication terminal device.

(Third Preferred Embodiment) FIG. 14 is a flowchart illustrating a center called process executed by the main control unit 2101 of the center device 2040 of FIG. 10 according to a third preferred embodiment as another example of the second preferred embodiment.

At step S2021, a determination is carried out as to whether or not a center calling signal has been received from the digital MFP 2020. Until a determination of YES is made at step S2021, the process of step S2021 is repeated. When a determination of YES is made at step S2021, the process proceeds onto step S2022. At step S2022, the main control unit 2101 of the center device 2040 searches the customer information management table 2108*b* in accordance with the device information included in the received center calling signal. The corresponding customer management information is displayed on the display unit 2104 to notify the operator of the center device 2040. Next, at step S2023, a call control calling signal is transmitted in accordance with the searched corresponding customer management information to establish a voice communication session between the center device 2040 and the corresponding digital MFP 2020 by the SIP, for example. Accordingly, at step S2024, the operator of the center device 2040 can communicate with the user of the digital MFP 2020 via the Internet 2090 by using the VOIP while confirming the customer management information displayed on the display unit 2104. An analog audio signal of voice communication contents is converted into a digital audio signal by the audio signal processing unit 2014. The converted digital audio signal is temporarily stored in the RAM 2007 as an audio file. When the voice communication ends, the voice communication session is opened at step S2005. At step S2026, a communication time of the voice communication and the audio file are stored in the customer information management table 2108*b*. Then, the center called process ends.

According to the third preferred embodiment, the hard disk drive 2108 of the center device 2040 stores the customer information management table 2108*b* including customer management information for each digital MFP 2020 as illustrated in FIG. 10. The main control unit 2101 of the center device 2040 receives a center calling signal including the device information of the digital MFP 2020 transmitted from the digital MFP 2020 via the Internet 2090 by the operation of the center calling key 2005*a* of the digital MFP 2020 (YES at step S2021 of FIG. 14). The main control unit 2101 of the center device 2040 searches the customer management information stored in the customer information management table 2108*b* in accordance with the device information included in the received center calling signal, and displays the searched customer management information on the display unit 2104 for notification (step S2022). In addition, the main control unit 2101 of the center device 2040 establishes a voice communication session between the digital MFP 2020 and the center device 2040 via the Internet 2090 (steps S2023 and S2024). Therefore, when a trouble generates in the digital MFP 2020 in a remote maintenance system, the operator of the center device 2040 can easily and economically communicate with the user of the digital MFP 2020 while referring to the customer management information notified by a simple operation performed by the user of the digital MFP 2020.

When a voice communication session is established between the digital MFP 2020 and the center device 2040 via the Internet 2090, the main control unit 2101 of the third preferred embodiment generates an audio file of the voice communication contents and communication time information of the voice communication session. Then, the generated audio file and the communication time information are stored into the customer information management table 2108*b*. Therefore, the operator of the center device 2040 can refer to the audio file of the voice communication contents and the communication time information of the voice communication session stored in the customer information management table 2108*b* and efficiently use the audio file and the communication time information for a future failure or the like. That is, an integration control program for the center device 2040 managing the digital MFP 2020 can be presented.

The first through the third preferred embodiments of the present invention relate to an example of the digital MFP. The present invention is not limited to this example. The present invention is widely applicable to a facsimile machine or a facsimile server device having a facsimile function.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A remote maintenance system comprising:
    a communication terminal device; and
    a center device which is connected to the communication terminal device via a prescribed communication line and monitors a failure in the communication terminal device;
    wherein the center device includes a storage unit which stores device information of the communication terminal device and a customer information management table,
    the center device responds to a failure notification signal including the device information from the communication terminal device, refers to the customer information management table, and automatically transmits a call instruction signal to the communication terminal device via the communication line, and the communication terminal device responds to the call instruction signal and notifies the call to a user, wherein after notifying the call to the user, the communication terminal device automatically transmits a center calling signal via the communication line in accordance with an instruction of the user, wherein the center device responds to the center calling signal including the device information from the communication terminal device, refers to the customer information management table, and automatically originates a call to a prescribed telephone number via the communication line to enable communication between the center device and the communication terminal device, wherein when a calling key validation mode is set, the center device automatically originates a call.

2. A center device for a remote maintenance system including a communication terminal device and the center device, which is connected to the communication terminal device via a prescribed communication line and manages a failure in the communication terminal device, the center device comprising:

a storage unit which stores device information of the communication terminal device and a customer information management table, wherein the center device responds to a failure notification signal including device information from the communication terminal device, refers to the customer information management table, and automatically transmits a call instruction signal to the communication terminal device via the communication line, wherein the center device responds to a center calling signal including the device information from the communication terminal device, refers to the customer information management table, and automatically originates a call to a prescribed telephone number via the communication line to enable communication between the center device and the communication terminal device, wherein when a calling key validation mode is set, the center device automatically originates a call.

* * * * *